US012570227B2

(12) United States Patent
Rutman et al.

(10) Patent No.: US 12,570,227 B2
(45) Date of Patent: Mar. 10, 2026

(54) ACCESSORY BASE PLATE WITH POWER ROUTING

(71) Applicant: Ford Global Technologies, LLC, Dearborn, MI (US)

(72) Inventors: Matthew B. Rutman, Westland, MI (US); Stuart C. Salter, White Lake, MI (US); Michael M. Azzouz, Farmington, MI (US); Dan Ritz, Windsor (CA); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 390 days.

(21) Appl. No.: 18/107,311

(22) Filed: Feb. 8, 2023

(65) Prior Publication Data

US 2024/0262304 A1 Aug. 8, 2024

(51) Int. Cl.
　*B60R 16/023* (2006.01)
　*B60R 16/02* (2006.01)
　*B60R 16/03* (2006.01)
(52) U.S. Cl.
　CPC ...... *B60R 16/0239* (2013.01); *B60R 16/0215* (2013.01); *B60R 16/03* (2013.01)
(58) Field of Classification Search
　CPC .. B60R 16/0239; B60R 16/0215; B60R 16/03
　See application file for complete search history.

(56) References Cited

U.S. PATENT DOCUMENTS

| | | | |
|---|---|---|---|
| 6,176,657 B1 * | 1/2001 | Romph | B60P 7/0892 |
| | | | 410/121 |
| 10,583,962 B2 | 3/2020 | Brunner et al. | |
| 10,703,534 B2 | 7/2020 | Brunner et al. | |
| D895,966 S | 9/2020 | Brunner et al. | |
| D895,967 S | 9/2020 | Brunner et al. | |
| D896,517 S | 9/2020 | Brunner et al. | |
| D896,518 S | 9/2020 | Brunner et al. | |
| D897,103 S | 9/2020 | Brunner et al. | |
| D898,320 S | 10/2020 | Brunner et al. | |
| 10,829,059 B1 | 11/2020 | Addison et al. | |
| 10,919,428 B2 | 2/2021 | Wallace et al. | |
| 10,962,218 B2 | 3/2021 | Plato et al. | |
| 10,981,696 B2 | 4/2021 | Brunner et al. | |
| D917,977 S | 5/2021 | Brunner et al. | |
| D918,584 S | 5/2021 | Brunner et al. | |
| D919,296 S | 5/2021 | Brunner et al. | |
| 11,008,136 B2 | 5/2021 | Brunner et al. | |
| D920,671 S | 6/2021 | Brunner et al. | |

(Continued)

FOREIGN PATENT DOCUMENTS

GB 2424317 A * 9/2006 ........... B60R 16/037

OTHER PUBLICATIONS

US 10,947,009 B2, 03/2021, Brunner et al. (withdrawn)

*Primary Examiner* — Derek J Battisti
(74) *Attorney, Agent, or Firm* — Vichit Chea; Carlson, Gaskey & Olds, P.C.

(57) ABSTRACT

A base plate system includes a base plate with a surface to support an accessory and a power box mounted to the base plate. The power box includes at least one power outlet. An electrical connector connects the power box to a power source to be able to provide power to the accessory via the at least one power outlet.

19 Claims, 3 Drawing Sheets

(56)                References Cited

U.S. PATENT DOCUMENTS

| | | | |
|---|---|---|---|
| 11,027,883 B1 | 6/2021 | Brunner et al. | |
| D923,935 S | 7/2021 | Brunner et al. | |
| 11,192,690 B1 | 12/2021 | Brunner et al. | |
| 11,268,691 B2 | 3/2022 | Plato et al. | |
| 11,365,026 B2 | 6/2022 | Brunner et al. | |
| 11,427,382 B2 | 8/2022 | Brunner et al. | |
| 11,465,805 B2 | 10/2022 | Brunner et al. | |
| 11,964,632 B2 * | 4/2024 | Rutman | B60P 7/0815 |
| 2006/0033377 A1 * | 2/2006 | Frimel | B60P 1/003 |
| | | | 298/1 A |
| 2008/0260486 A1 | 10/2008 | Bequette | |
| 2013/0094931 A1 * | 4/2013 | Bluhm | B60P 1/431 |
| | | | 414/523 |
| 2019/0084506 A1 * | 3/2019 | Gutierrez | H02K 11/33 |
| 2020/0317057 A1 * | 10/2020 | Salter | B60L 1/006 |
| 2020/0391645 A1 | 12/2020 | Ieradi | |
| 2022/0009562 A1 | 1/2022 | Mannone | |
| 2022/0126928 A1 | 4/2022 | Elder et al. | |
| 2022/0200292 A1 * | 6/2022 | Lautenbach | H02J 4/00 |
| 2022/0399760 A1 * | 12/2022 | Partovi | B60R 16/03 |
| 2023/0110428 A1 * | 4/2023 | Rutman | B60R 11/06 |
| | | | 414/462 |
| 2024/0025361 A1 * | 1/2024 | Salter | B60R 16/03 |

* cited by examiner

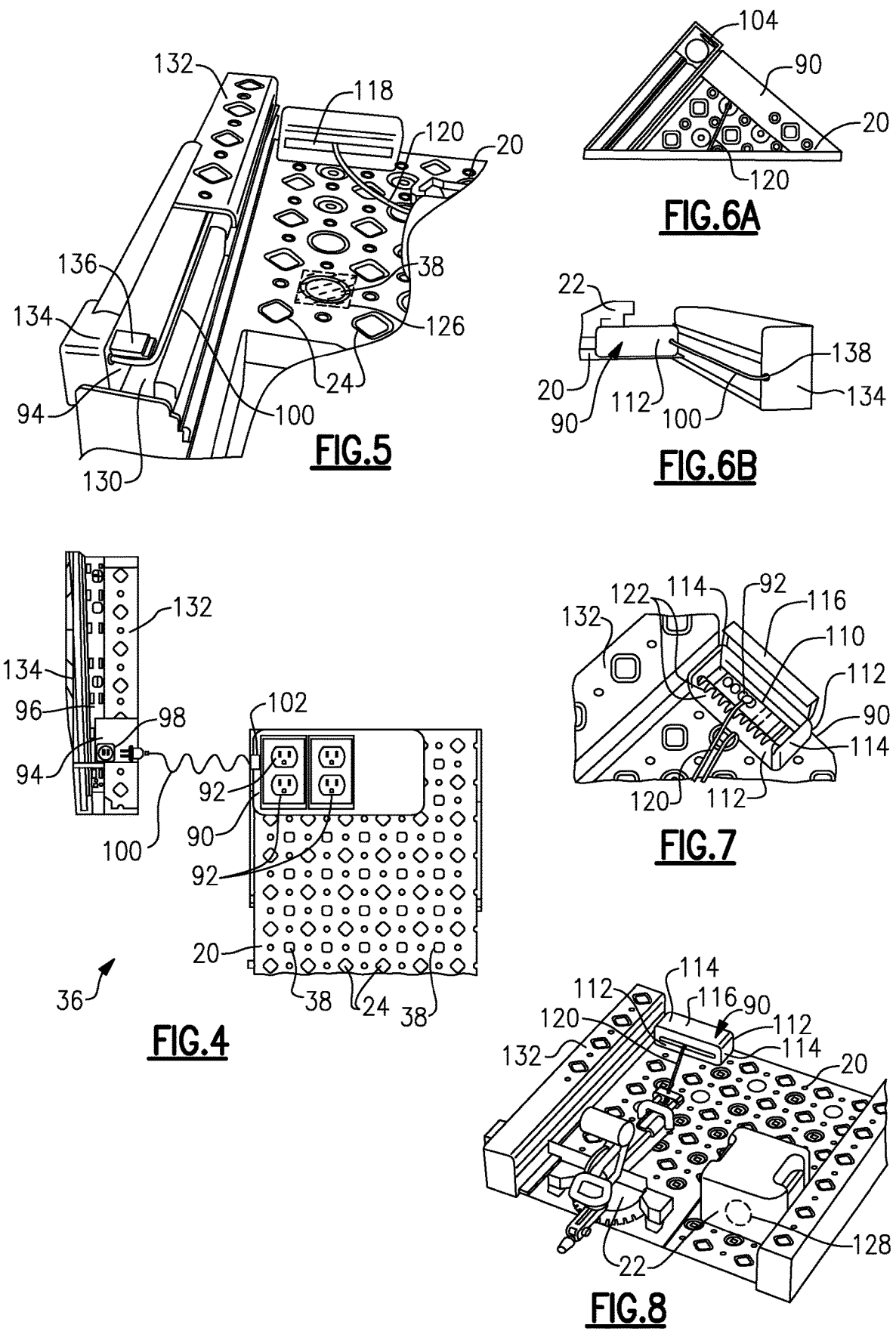

ACCESSORY BASE PLATE WITH POWER ROUTING

TECHNICAL FIELD

This disclosure relates generally to a base plate that secures accessories within a cargo or work area and, more particularly, to a base plate system that includes power routing to supply power to accessories that are supported by the base plate.

BACKGROUND

Vehicles transport various types of cargo. A user can, for example, rely on a vehicle to transport accessories, such as containers and tools, to and from a jobsite. The accessories that are transported can vary based on the tasks the user performs at the jobsite. Some accessories may require power.

SUMMARY

In some aspects, the techniques described herein relate to a base plate system, including: a base plate that includes a surface to support an accessory; a power box mounted to the base plate, wherein the power box includes at least one power outlet; and an electrical connector to connect the power box to a power source to be able to provide power to the accessory via the at least one power outlet.

In some aspects, the techniques described herein relate to a base plate system, wherein the base plate is movable relative to a fixed structure between a retracted position and an extended position, and wherein the power box is fixed for movement with the base plate.

In some aspects, the techniques described herein relate to a base plate system including a power panel mounted on the fixed structure, wherein the power panel receives power from the power source, and wherein the electrical connector connects the power panel to the power box.

In some aspects, the techniques described herein relate to a base plate system including a compensator mounted on the fixed structure that cooperates with the electrical connector to take up any slack of the electrical connector as the base plate moves between the retracted position and the extended position.

In some aspects, the techniques described herein relate to a base plate system, wherein the electrical connector comprises a power cord and the compensator comprises a cable reel.

In some aspects, the techniques described herein relate to a base plate system, wherein the power box includes an opening through which an accessory electrical connector can extend to connect the accessory to the at least one power outlet.

In some aspects, the techniques described herein relate to a base plate system, wherein the power box includes a bottom wall, a first set of side walls extending up from one set of opposing edges of the bottom wall, a second set of side walls extending up from another set of opposing edges of the bottom wall and connecting the first set of side walls to each other, and a cover that is movable between an open position and a closed position to define an internal cavity in which the at least one power outlet is located.

In some aspects, the techniques described herein relate to a base plate system, wherein the at least one power outlet comprises a plurality of power outlets, and wherein the opening comprises a slot formed in one side wall of the first and second sets of side walls, and wherein the slot extends along a length of the one side wall such that multiple accessory electrical connectors can extend to connect a respective accessory to one of the plurality of power outlets.

In some aspects, the techniques described herein relate to a base plate system including: a first track structure configured to extend along one side of a vehicle cargo area; a second track structure configured to extend along an opposite side of a vehicle cargo area; the base plate having a first edge and a second edge opposite of the first edge, wherein the first edge is supported by the first track structure and the second edge is supported by the second track structure such that the base plate slides along the first track structure and the second track structure to move between the extended and retracted positions.

In some aspects, the techniques described herein relate to a base plate system including: wherein the first track structure and the second track structure each comprise at least a first tier track and a second tier track such that a distance between a bottom surface of the base plate and a support surface of the vehicle cargo area can be adjusted to provide a lowered position and a raised position, and including: a power panel mounted on a fixed structure along a side of the vehicle cargo area, wherein the power panel receives power from the power source, and wherein the electrical connector connects the power panel to the power box; and a compensator that cooperates with the electrical connector to take up any slack of the electrical connector as the base plate moves between the retracted position and the extended position, and as the base plate moves between the raised and the lowered position.

In some aspects, the techniques described herein relate to a base plate system, wherein the base plate includes a plurality of power connection apertures configured to interface with an accessory, and wherein each power connection aperture includes an inductive charging member configured to interface with an inductive charging member on the accessory, and wherein the inductive charging members on the base plate are charged via the power source.

In some aspects, the techniques described herein relate to a base plate system, including: a base plate that is configured support an accessory; a first track structure configured to extend along one side of a vehicle cargo area; a second track structure configured to extend along an opposite side of a vehicle cargo area; the base plate having a first edge and a second edge opposite of the first edge, wherein the first edge is supported by the first track structure and the second edge is supported by the second track structure such that the base plate slides along the first track structure and the second track structure to move between an extended position and a retracted position; a power box mounted to the base plate, wherein the power box includes at least one power outlet and is fixed for movement with the base plate; and an electrical connector to connect the power box to a power source to be able to provide power to the accessory via the at least one power outlet.

In some aspects, the techniques described herein relate to a base plate system including a power panel mounted on the fixed structure, wherein the power panel receives power from the power source, and wherein the electrical connector connects the power panel to the power box.

In some aspects, the techniques described herein relate to a base plate system including a compensator mounted on the fixed structure that cooperates with the electrical connector to take up any slack of the electrical connector as the base plate moves between the retracted position and the extended position.

In some aspects, the techniques described herein relate to a base plate system, wherein the power box includes a bottom wall, a first set of side walls extending up from one set of opposing edges of the bottom wall, a second set of side walls extending up from another set of opposing edges of the bottom wall and connecting the first set of side walls to each other, and a cover that is movable between an open position and a closed position to define an internal cavity in which the at least one power outlet is located.

In some aspects, the techniques described herein relate to a base plate system, wherein the at least one power outlet comprises a plurality of power outlets, and including a slot formed in one side wall of the first and second sets of side walls, and wherein the slot extends along a length of the one side wall such that multiple accessory electrical connectors can extend to connect a respective accessory to one of the plurality of power outlets.

In some aspects, the techniques described herein relate to a method, the method including: providing a base plate that includes a surface to support an accessory; mounting a power box to the base plate, wherein the power box includes at least one power outlet; and connecting the power box to a power source with an electrical connector such that power can be provided to the accessory via the at least one power outlet.

In some aspects, the techniques described herein relate to a method including providing sliders such that the base plate is movable relative to a fixed structure between a retracted position and an extended position, and fixing the power box for movement with the base plate.

In some aspects, the techniques described herein relate to a method including mounting a power panel on the fixed structure, wherein the power panel receives power from the power source, and using the electrical connector to connect the power panel to the power box.

In some aspects, the techniques described herein relate to a method including a compensator that cooperates with the electrical connector to take up any slack of the electrical connector as the base plate moves between the retracted position and the extended position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 4 is a schematic view of a power routing system to route power from a power source to an accessory mounting on the base plate.

FIG. 5 is a perspective top view, with a portion an upper rail removed for clarity, of one example of a power routing system.

FIG. 6A is a top view of the power routing system in a retracted position.

FIG. 6B is a perspective end view of the power routing system in an extended position.

FIG. 7 is a perspective top view of one example of a power box in an open position.

FIG. 8 is a perspective top view showing an accessory connected to the power routing system.

DETAILED DESCRIPTION

This disclosure details a base plate that is positioned within a vehicle cargo area and a power routing system that can convey power to accessories that are supported on the base plate. The base plate provides an attachment interface for securing accessories to the vehicle. An adjustment system allows the base plate to be moved between retracted and extend positions, as well as allowing a height of the base plate within the vehicle cargo area to be selectively adjusted. Various types of accessories can be secured to the vehicle through the attachment interface provided by the base plate. Some accessories require power and the power routing system is able to provide power to the accessories on the base plate in all of the different adjustment positions. This provides a user with a substantially modular and adjustable mounting and attachment system.

Figure 1:
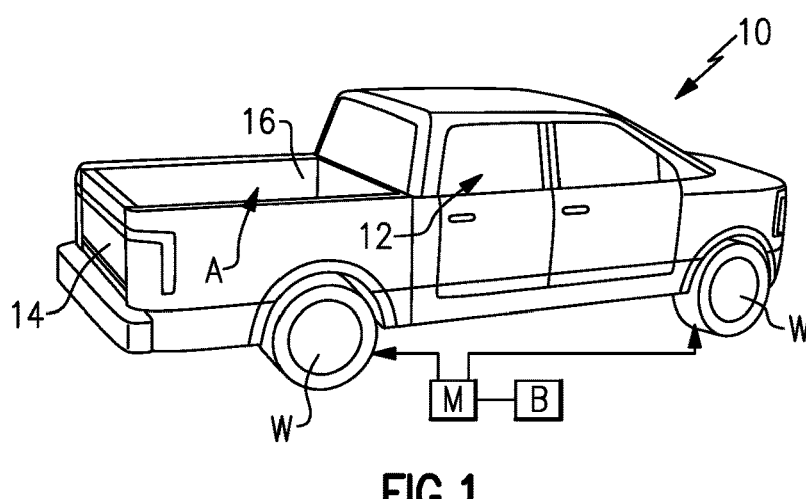
FIG. 1 illustrates a perspective view of a vehicle having a cargo bed that can be equipped with base plates used to secure accessories according to an exemplary aspect of the present disclosure.

FIGS. 1-3F disclose exemplary embodiments of an adjustable base plate system that interfaces with a track structure within a vehicle cargo area. With reference to FIGS. 1 and 2A-2B, a vehicle 10 includes a passenger compartment 12 and a tailgate 14 that encloses one end of a cargo bed 16 that is aft of the passenger compartment 12. The cargo bed 16 has a floor/support surface 18 and provides an open cargo area A. In this example, the vehicle 10 is a pickup truck. However, the vehicle 10 could be another type of vehicle in another example, such as a car, van, sport utility vehicle, etc. that has a support surface 18 for a cargo area.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

In particular, the example vehicle 10 includes an electrified powertrain capable of applying a torque from an electric machine M (e.g., an electric motor) to drive a least one set of wheels W. The vehicle 10 can include a traction battery pack B, which powers the electric machine M and, potentially, other electrical loads of the vehicle 10.

Various accessories and/or modules 22 can be secured to the vehicle 10 by engaging one or more of the base plates 20. The accessories/modules 22 can comprise a lockable storage box that holds tools, a refrigerator, etc. The accessory 22 could also be a lidded lockable container that includes a compartment for storing power tools or other items that require power or data connection. Or, the accessories 22 could comprise power tools that are directly supported on the base plate 20.

The accessories 22 can engage one or more of the base plates 20 using an attachment system. In the exemplary embodiment, the attachment system includes a plurality of mounting apertures 24 and at least one foot 26 that cooperate to provide a mechanical connection interface. The base plate 20 is supported on the vehicle surface 18 of the cargo area A with an additional support interface that is separate from the mechanical connection interface for the accessories 22. In one example, the additional support interface comprises a track assembly.

In one example, the base plates 20 provide the mounting apertures 24 and the accessories 22 include a plurality of feet 26. This could be rearranged, however, such that one or all of the feet 26 extend from the base plates 20 and the accessories 22 provide some or all of the mounting apertures 24.

Figure 2A:
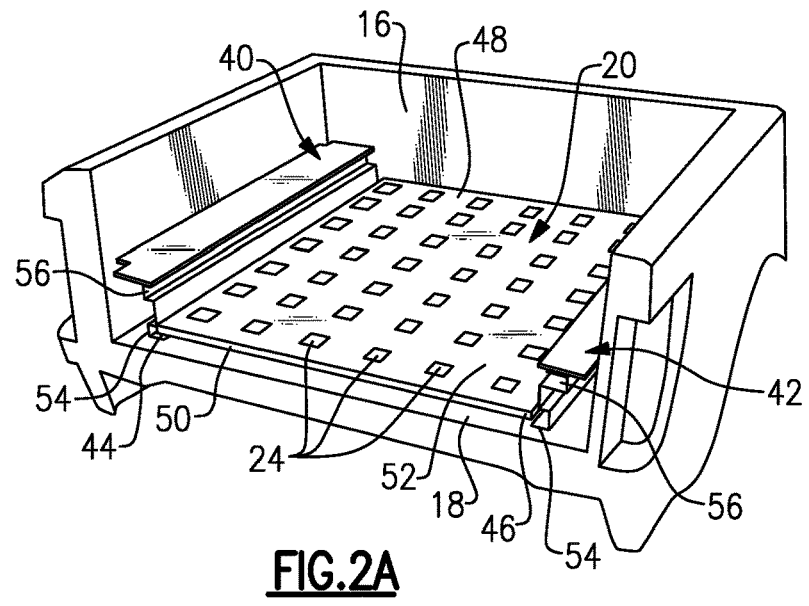
FIG. 2A is a perspective view of an adjustable base plate mounting system for a cargo bed, where the mounting system comprises a track.
Figure 2B:
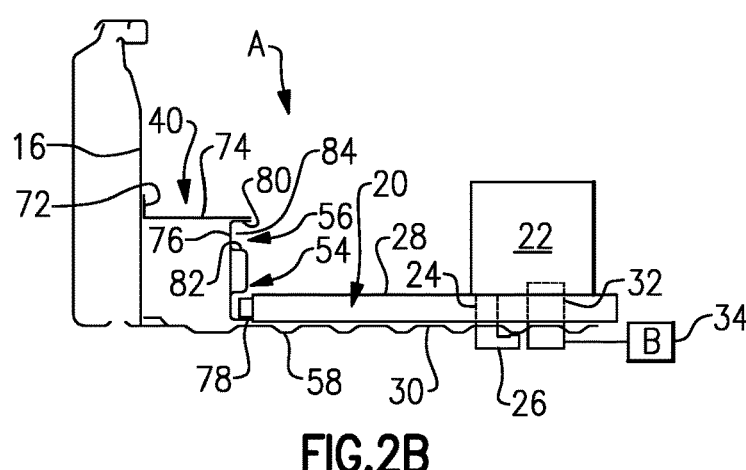
FIG. 2B is a section view of the adjustable base plate mounting system of FIG. 2A.

In the exemplary embodiment, when the base plate 20 and the accessories 22 are engaged, the feet 26 are each received within one of the mounting apertures 24 such that the feet 26 each extend from a first side 28 of the base plate 20, through one of the mounting apertures 24, and past an opposite, second side 30 of the base plate 20 as schematically shown in FIG. 2B.

In one example, the accessory 22 comprises a lockable box that is mechanically coupled to the vehicle 10 through the base plate 20. Optionally, the accessory 22 could additionally comprise a lockable box that includes a power interface 32. This would allow devices within the lockable box to be powered from a vehicle power supply 34 such as the battery pack B, for example. The internal device could be a refrigerated container that is powered by the vehicle 10 when the box is engaged with the base plate 20, or the devices within the lockable box could comprise rechargeable tools, which can be recharged when set within the box and coupled to a charging interface between the accessory 22 and the base plate 20. In one example, a power routing system 36 (FIG. 4) is used such that the base plate 20 can be plugged into either 12V vehicle power or other power sources via a variety of connections/outlets.

In one example, the power interface 32 comprises an inductive power interface where an inductive power generation module is associated with one of the baseplate 20 and the accessory 22 and an inductive power receiver module associated with the other of the baseplate 20 and the accessory 22. In one example, the inductive power generation module is associated with the base plate 20 and communicates with the inductive power receiver module through a power connection aperture 38 formed in the base plate 20. An example of such an inductive power interface is found in application Ser. No. 17/716,053 filed on Apr. 8, 2022, which is assigned to the assignee of the subject application, and which is herein incorporated by reference.

In the subject disclosure, a track assembly is used to mount one or more base plates 20 within a cargo area A. In one example, the track assembly comprises a first track structure 40 configured to extend along one side of the vehicle cargo area A and a second track structure 42 configured to extend along an opposite side of the vehicle cargo area A. The base plate 20 has a first edge 44 and a second edge 46 opposite of the first edge 44. The first edge 44 is supported by the first track structure 40 and the second edge 46 is supported by the second track structure 42. In one example, the first 44 and second 46 edges extend in a longitudinal direction along a length of the vehicle 10.

As shown in FIG. 2A, the first 44 and second 46 edges are parallel to each other. The base plate 20 also has a third edge 48 and a fourth edge 50 that are parallel and spaced apart from each other. The third 48 and fourth 50 edges connect to the first 44 and second 46 edges such that the base plate 20 comprises a four-sided generally flat and planar mount surface 52 to support the accessories 22.

The subject disclosure provides that the first 40 and second 42 track structures allow the base plate 20 to be mounted at different vertical height levels within the cargo area A. In one example, the first track structure 40 and the second track structure 42 each comprise at least a first tier track 54 and a second tier track 56. In one example, the second tier tracks 56 are spaced apart from respective first tier tracks 54 in a vertical direction V relative to the support surface 18 of the vehicle cargo area A. The base plate 20 can be supported by either the first tier tracks 54 or by the second tier tracks 56 such that a distance between a bottom surface 58 of the base plate 20 and the support surface 18 of the vehicle cargo area can be adjusted.

In FIGS. 2A-B a two-tier track is shown; however, additional tiers could be added as needed such that the distances between the bottom surface 58 of the base plate 20 and the support surface 18 of the vehicle cargo area A can be further varied. Optionally, two or more base plates 20 could be installed at the same time to provide support for a plurality of accessories 22, or to provide a support for accessories 22 within the cargo bed 16 in combination with a cover for the cargo bed 16. In the example shown in FIG. 3F, at least an additional third tier track 60 is provided on each of the first track structure 40 and the second track structure 42. The third tier track 60 is spaced apart from the first 54 and second 56 tier tracks in the vertical direction V. In one example, when the base plate 20 is installed on the third tier track 60, the base plate serves as a tonneau cover 62 that encloses the vehicle cargo area A.

Figures 3A, 3B, 3C, 3D, 3E, 3F:
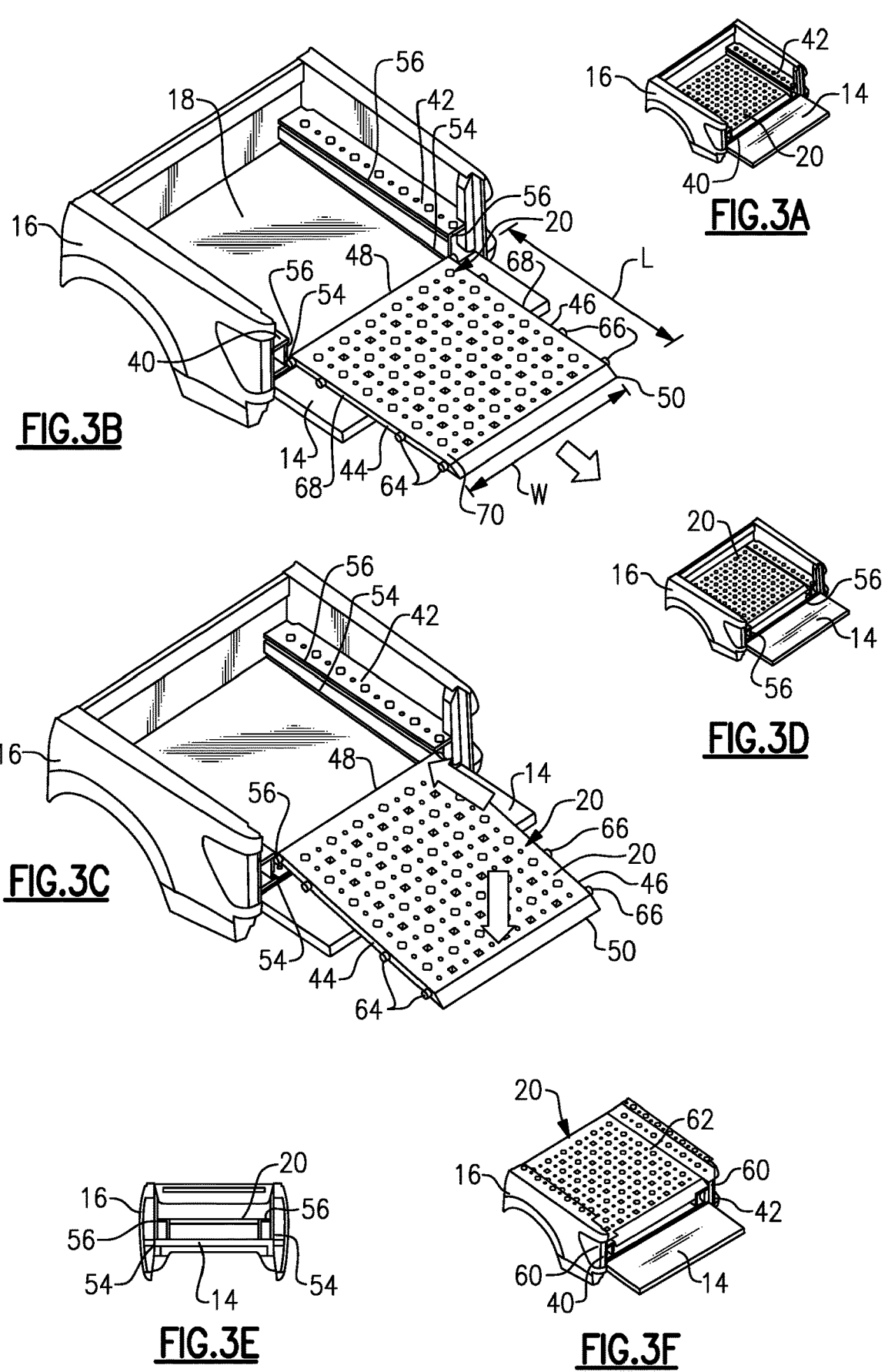
FIG. 3A is a perspective view of an adjustable base plate mounting system with the base plate in a fully installed position on a lower tier of the track.
FIG. 3B is a view similar to FIG. 3A but showing that the base plate can be extended outwardly of the cargo bed for removal.
FIG. 3C is a view similar to FIG. 3A but shows the base plate pivoting from the lower tier of the track to an upper tier of the track.
FIG. 3D is a view similar to FIG. 3A but shows the base plate fully installed on the upper tier of the track.
FIG. 3E is an end view of FIG. 3D.
FIG. 3F is a perspective view with the track including an additional upper tier such that the base plate can be used as a cover for the cargo bed.

By installing the base plate 20 on the second tier track 56, the base plate 20 is vertically higher than when the base plate 20 is supported by the first tier track 54. This increases the available cargo area between the bottom surface 58 of the base plate 20 and the support surface 18 of the cargo area A. Additionally, the support surface 18 is free from any base plate support structures between the first track structure 40 and the second track structure 42 as shown in FIG. 3E. This further increases available cargo area and also allows for the base plates to be completely removed from the vehicle such that the support surface 18 can receive large, tall items such as furniture, large boxes, etc.

In one example, the edges 44, 46 of the base plate 20 include low-friction members that allow the base plate 20 to be easily moved along the first 54 and second 56 tier tracks such that the base plate 20 can be switched between the two different height levels. In one example, a first set of sliders or rollers 64 are positioned on the first edge 44 of the base plate 20 and a second set of sliders or rollers 66 are positioned on the second edge 46 of the base plate 20.

In one example, the base plate 20 has a width W extending in a lateral direction across a width of the vehicle V and a length L extending in a longitudinal direction along a length of the vehicle 10. The first 44 and second 46 edges of the base plate 20 extend in the longitudinal direction and the third 48 and fourth 50 edges of the base plate 20 extend in the lateral direction. The first 44 and second 46 edges of the base plate 20 have edge surfaces 68 that are perpendicular to a cargo support surface 70 of the base plate 20. The first 64 and second 66 sets of rollers are respectively spaced apart from each other in the longitudinal direction along the first 44 and second 46 edges of the base plate 20. In one example, the first 64 and second 66 sets of rollers extend outwardly of the first 44 and second 46 edges of the base plate 20 in the lateral direction. In one example, the rollers comprise axles that are fixed to the base plate edges with roller elements supported on the axles to independently rotate about a respective axis of the axles.

In one example, the first track structure 40 and the second track structure 42 are steel, roll-formed structures that are mounted to sides of the cargo bed 16 and/or to outermost edge portions of the support surface 18. In one example, the first 40 and second 42 track structures have a cross-section that comprises a first flange 72 extending in the vertical direction, a first or upper plate 74 that extends from the first flange 72 to a second or side plate 76, and a second flange 78 that extends from the side plate 76 in a lateral direction. The first plate 74 extends in the lateral direction and the second plate 76 extends in a vertical direction. The first flange 72 is attached to a side surface of the cargo bed 16 and the second flange 78 is attached to the support surface 18. The first 54 and second 56 tier tracks are formed within the side plate 76. In one example, the first 54 and second 56 tier tracks comprise an upper surface 80, a lower surface 82, and a side surface 84 that extends between the upper 80 and lower 82 surfaces to form a C-shape or U-shape. The open cross-section of the C-shape or U-shape is open in a direction that faces the cargo area A. Thus, as FIGS. 2A-B show a two-tier track configuration, each of the first 40 and second 42 track structures include two C-shape portions, one for each tier. For additional tiers, the height of the side plate 76 would be increased such that additional C-shape portions could be formed in the side plate 76. As discussed above, the first 64 and second 66 sets of rollers are either positioned on the first tier track 54, the second tier track 56, or on an additional tier track to install the base plate 20 in the vehicle cargo area A.

FIG. 3A shows the base plate in a fully installed position on the lower tier track 54. To change the position of the base plate 20, the fourth edge 50, e.g. a rearward edge, of the base plate 20 is moved at least partially outwardly of the vehicle cargo area A via the first 64 and second 66 sets of rollers along the first tier track 54 as shown in FIG. 3B. The base plate 20 is then removed from the first tier track 54 and is installed on the second tier track 56. Optionally, the base plate 20 can be completely removed from the cargo area A as needed.

In one example, the base plate 20 is moved in a rearward direction along the lower tier track 54 such that a rearward end of the base plate 20 extends outwardly of the vehicle cargo area, and then the rearward end of the base plate 20 is pivoted downward to move a forward end 48 of the base plate 20 in an upward direction to the upper tier track 56 as shown in FIG. 3C. Finally, the forward end of the base plate 20 is then moved in a forward direction to install the base plate 20 on the upper tier track 56 as shown in FIGS. 3D-E. FIG. 3E shows how much the cargo area underneath the base plate 20 is increased by moving to the upper tier. FIG. 3F shows the base plate installed on an additional upper tier track 60 to provide the option of a cover 62.

In one example, a handle is used to move the base plate 20 between the extended and retracted positions. Additionally, a locking mechanism can be used to lock the base plate 20 in a desired adjustment position. An example of a handle and locking mechanism is found in application Ser. No. 17/886,663 filed on Aug. 12, 2022, which is assigned to the assignee of the subject application, and which is herein incorporated by reference.

FIG. 4 shows a schematic example of the power routing system 36 as incorporated within the vehicle 10. In one example, a power box 90 mounted to the base plate 20 and includes one or more power outlets 92. A power panel 94 is mounted on a fixed structure such as a side frame member 96 extending along the cargo area. The power panel 94 includes one or more power outlets 98. The power panel 94 receives power from a power source, such as the battery pack for example. An electrical connector 100 connects the power panel 94 to a connection interface 102 to the power box 90 to be able to provide power to the accessory 22 via one of the power outlets 92.

The power box 90 is fixed for movement with the base plate 20 between the retracted and extended positions. In one example, a compensator 104 (FIG. 6A) cooperates with the electrical connector 100 to take up any slack of the electrical connector 100 as the base plate 20 moves between the retracted position and the extended position. In one example, the compensator 104 can cooperate with the electrical connector 100 to also adjust for movement of the base plate between the raised and the lowered position. In one example, the electrical connector 100 comprises a power cord and the compensator 104 comprises a cable reel as shown in FIG. 6A. In one example, constant tension can be provided by a clock spring (not shown) via the cord reel integrated into the side member. In another example, a cable pulley is on gimbal (not shown) so that it can move/adjust vertically to the top tier where it would be even with a side wall of the vehicle.

In one example, the power box 90 includes a bottom wall 110, a first set of side walls 112 extending up from one set of opposing edges of the bottom wall 110, and a second set of side walls 114 extending up from another set of opposing edges of the bottom wall 110. The second set of side walls 114 connect the first set of side walls 112 to each other. The bottom wall 110 and side walls 112, 114 form a box-shape with an open internal cavity. In one example, a cover 116 is mounted on the power box 90 to be movable between an open position and a closed position. The power outlets 92 are located within the internal cavity and are protected when the cover 116 is in the closed position. The power outlets 92 are shown as being located in the bottom wall 110; however, the outlets 92 could be moved to one of the side walls 112, 114, or additional outlets 92 could be located in the side walls 112, 114.

In one example, the power box 90 includes an opening 118 through which an accessory electrical connector 120 can extend to connect the accessory 22 to one of the power outlets 92 (see FIG. 5). In one example, the opening 118 comprises a slot formed in the front wall of the power box 90 and extends along a length of the wall such that multiple accessory electrical connectors 120 can extend to connect a respective accessory 22 to one of the plurality of power outlets 92. Additional openings could be formed in the walls of the power box 90, or the opening could be moved to one of the other side walls as needed.

In one example, a lower surface of the slotted opening 118 includes a plurality of detents or grooves 122. These grooves 122 can securely hold the accessory electrical connectors 120 in a gripping manner such that the connectors 120 do not move around relative to the power box 90.

In one example, the base plate 20 includes a plurality of power connection apertures 38, as described above, which are configured to interface with the accessory 20 for inductive charging. Each power connection aperture 38 includes an inductive charging member 126 that is configured to interface with an inductive charging member 128 on the accessory 22. In one example, the inductive charging members 126 on the base plate 20 are charged via the power source.

FIG. 5 shows the electrical connector 100 housed within an enclosure 130 extending along a side of the cargo area and covered by a top rail 132. The power panel 94 is located on a side wall 134 and includes a flip cover 136 that is raised as shown to provide access to the power outlet 98. In the example shown, a plug of the electrical connector 100 is inserted into the power outlet 98 and the cord is tensioned to extend along the side of the cargo area within the enclosure 130.

FIG. 6A shows the compensator 104, which in this example comprises a cable reel, that is used to take up the slack of the electrical connector 100 as the base plate 20 moves between adjustment positions. FIG. 6A shows the base plate 20 in the retracted position. The electrical connector 100 is shown as extending out of the power box 90 via the opening 118 (FIG. 5). FIG. 6B shows the base plate 20 in the extended position where the electrical connector 100 has been pulled/extended out of an opening 138 in the side wall 134.

FIG. 7 shows the power box 90 with the cover 116 in the open position. The electrical connector 100 extends through the opening 118 and connects to one of the power outlets 92.

FIG. 8 shows multiple accessories 22 supported on the base plate 20. One accessory has an electrical connector 120 that connects to the power box 90, and another accessory has an inductive charging member 128 that is paired with an inductive charging member 126 on the base plate 20 (FIG. 5). The power box 90 has the lid 116 in the closed position to protect the electrical outlets 92 within the internal cavity.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A base plate system, comprising:
a base plate that includes a surface to support an accessory, wherein the base plate includes a plurality of mounting apertures that receive one or more protrusions associated with the accessory;
a power box mounted to the base plate, wherein the power box includes at least one power outlet;
a power panel mounted on a fixed structure separate from the base plate;
an electrical connector to connect the power box to the power panel and a power source that supplies power to the power panel such that the accessory is powered via the at least one power outlet, wherein the electrical connector comprises a first cord that connects the power panel to a connection interface of the power box to power the at least one power outlet; and
a second cord that connects the accessory to the at least one power outlet.

2. The base plate system of claim 1, wherein the base plate is movable relative to the fixed structure between a retracted position and an extended position, and wherein the power box is fixed for movement with the base plate.

3. A base plate system, comprising:
a base plate that includes a surface to support an accessory, wherein the base plate includes a plurality of mounting apertures that receive one or more protrusions associated with the accessory, and wherein the base plate is movable relative to a fixed structure between a retracted position and an extended position;
a power box mounted to the base plate, wherein the power box includes at least one power outlet, and wherein the power box is fixed for movement with the base plate;
a power panel mounted on the fixed structure separate from the base plate; and
an electrical connector to connect the power box to the power panel and a power source that supplies power to the power panel such that the accessory is powered via the at least one power outlet;
a compensator mounted on the fixed structure separate from the power panel, and wherein the compensator cooperates with the electrical connector to take up any slack of the electrical connector as the base plate moves between the retracted position and the extended position.

4. The base plate system of claim 3, wherein the electrical connector comprises a power cord and the compensator comprises a cable reel, wherein the base plate is moveable relative to the cable reel.

5. The base plate system of claim 1, wherein the power box includes an opening through which an accessory electrical connector can extend to connect the accessory to the at least one power outlet.

6. The base plate system of claim 5, wherein the power box includes a bottom wall, a first set of side walls extending up from one set of opposing edges of the bottom wall, a second set of side walls extending up from another set of opposing edges of the bottom wall and connecting the first set of side walls to each other, and a cover that is movable between an open position and a closed position to define an internal cavity in which the at least one power outlet is located.

7. The base plate system of claim 6, wherein the at least one power outlet comprises a plurality of power outlets, and wherein the opening comprises a slot formed in one side wall of the first and second sets of side walls, and wherein the slot extends along a length of the one side wall such that multiple accessory electrical connectors can extend to connect a respective accessory to one of the plurality of power outlets.

8. The base plate system of claim 2, including:
a first track structure configured to extend along one side of a vehicle cargo area;
a second track structure configured to extend along an opposite side of a vehicle cargo area;
the base plate having a first edge and a second edge opposite of the first edge, wherein the first edge is supported by the first track structure and the second edge is supported by the second track structure such that the base plate slides along the first track structure and the second track structure to move between the extended and retracted positions.

9. A base plate system, comprising:
a base plate that includes a surface to support an accessory, wherein the base plate includes a plurality of mounting apertures that receive one or more protrusions associated with the accessory, and wherein the base plate is movable relative to a fixed structure between a retracted position and an extended position;

a power box mounted to the base plate, wherein the power box includes at least one power outlet, and wherein the power box is fixed for movement with the base plate;

a power panel mounted on the fixed structure separate from the base plate;

an electrical connector to connect the power box to the power panel and a power source that supplies power to the power panel such that the accessory is powered via the at least one power outlet;

a first track structure configured to extend along one side of a vehicle cargo area;

a second track structure configured to extend along an opposite side of a vehicle cargo area, wherein the first track structure and the second track structure each comprise at least a first tier track and a second tier track such that a distance between a bottom surface of the base plate and a support surface of the vehicle cargo area can be adjusted to provide a lowered position and a raised position;

the base plate having a first edge and a second edge opposite of the first edge, wherein the first edge is supported by the first track structure and the second edge is supported by the second track structure such that the base plate slides along the first track structure and the second track structure to move between the extended and retracted positions;

the power panel being mounted on the fixed structure along a side of the vehicle cargo area, wherein the power panel receives power from the power source, and wherein the electrical connector connects the power panel to the power box; and a compensator that cooperates with the electrical connector to take up any slack of the electrical connector as the base plate moves between the retracted position and the extended position, and as the base plate moves between the raised and the lowered position.

10. The base plate system of claim 1, wherein the base plate includes a plurality of power connection apertures configured to interface with an accessory, wherein the plurality of power connection apertures are separate from the plurality of mounting apertures, and wherein each power connection aperture includes an inductive charging member configured to interface with an inductive charging member on the accessory, and wherein inductive charging members on the base plate are charged via the power source.

11. A base plate system, comprising:

a base plate that is configured support an accessory, wherein the base plate includes a plurality of mounting apertures that receive one or more protrusions associated with the accessory;

a first track structure configured to extend along one side of a vehicle cargo area;

a second track structure configured to extend along an opposite side of a vehicle cargo area;

the base plate having a first edge and a second edge opposite of the first edge, wherein the first edge is supported by the first track structure and the second edge is supported by the second track structure such that the base plate slides along the first track structure and the second track structure to move between an extended position and a retracted position;

a power box mounted to the base plate, wherein the power box includes at least one power outlet and is fixed for movement with the base plate;

a power panel mounted on a fixed structure separate from the base plate;

an electrical connector to connect the power box to the power panel and to a power source that supplies power to the power panel such that the accessory is powered via the at least one power outlet; and a compensator mounted on the fixed structure that cooperates with the electrical connector to take up any slack of the electrical connector as the base plate moves between the retracted position and the extended position.

12. The base plate system of claim 11, wherein the power box includes a bottom wall, a first set of side walls extending up from one set of opposing edges of the bottom wall, a second set of side walls extending up from another set of opposing edges of the bottom wall and connecting the first set of side walls to each other, and a cover that is movable between an open position and a closed position to define an internal cavity in which the at least one power outlet is located.

13. The base plate system of claim 12, wherein the at least one power outlet comprises a plurality of power outlets, and including a slot formed in one side wall of the first and second sets of side walls, and wherein the slot extends along a length of the one side wall such that multiple accessory electrical connectors can extend to connect a respective accessory to one of the plurality of power outlets, and wherein a lower surface of the slot includes a plurality of detents or grooves that receive accessory electrical connectors that connect each accessory to one of the plurality of power outlets.

14. A method comprising the steps of:

providing a base plate that includes a surface to support an accessory, wherein the base plate includes a plurality of mounting apertures that receive one or more protrusions associated with the accessory;

providing sliders such that the base plate is movable relative to a fixed structure between a retracted position and an extended position;

mounting a power box to the base plate, wherein the power box includes at least one power outlet;

fixing the power box for movement with the base plate;

mounting a power panel on the fixed structure separate from the base plate;

connecting the power box to the power panel and a power source with an electrical connector such that power is supplied from the power source, to the power panel, to the power box, and then to the accessory via the at least one power outlet; and using a compensator that cooperates with the electrical connector to take up any slack of the electrical connector as the base plate moves between the retracted position and the extended position.

15. A method comprising the steps of:

providing a base plate that includes a surface to support an accessory, wherein the base plate includes a plurality of mounting apertures that receive one or more protrusions associated with the accessory;

mounting a power box to the base plate, wherein the power box includes at least one power outlet;

mounting a power panel on a fixed structure separate from the base plate;

connecting the power box to the power panel and a power source with an electrical connector such that power is supplied from the power source, to the power panel, to the power box, and then to the accessory via the at least one power outlet; and wherein the electrical connector comprises a first cord that connects the power panel to a connection interface of the power box to power the at least one power outlet, and including:

connecting the accessory to the at least one power outlet using a second cord;

extending and retracting the first cord in response to movement of the base plate; and moving the second cord with the base plate.

16. A base plate system, comprising:

a base plate that is configured support an accessory, wherein the base plate includes a plurality of mounting apertures that receive one or more protrusions associated with the accessory;

a first track structure configured to extend along one side of a vehicle cargo area;

a second track structure configured to extend along an opposite side of a vehicle cargo area;

the base plate having a first edge and a second edge opposite of the first edge, wherein the first edge is supported by the first track structure and the second edge is supported by the second track structure such that the base plate slides along the first track structure and the second track structure to move between an extended position and a retracted position:

a power box mounted to the base plate, wherein the power box includes at least one power outlet and is fixed for movement with the base plate;

a power panel mounted on a fixed structure separate from the base plate;

an electrical connector to connect the power box to the power panel and to a power source that supplies power to the power panel such that the accessory is powered via the at least one power outlet; and wherein:

the base plate includes a plurality of power connection interfaces that are separate from the plurality of mounting apertures, wherein each power connection interface includes an inductive charging member configured to interface with an inductive charging member on the accessory;

inductive charging members on the base plate are charged via the power source; and when the one or more protrusions from the accessory are inserted through the plurality of mounting apertures, the inductive charging member on the accessory is aligned with at least one power connection interface of the plurality of power connection interfaces.

17. The base plate system of claim 1, wherein the first cord extends and retracts in response to movement of the base plate, and wherein the second cord moves with the base plate.

18. The base plate system of claim 17, wherein the at least one power outlet comprises a plurality of power outlets, and including an additional cord for each additional accessory to connect to one of the plurality of power outlets.

19. A base plate system, comprising:

a base plate that includes a surface to support an accessory, wherein the base plate includes a plurality of mounting apertures that receive one or more protrusions associated with the accessory;

a power box mounted to the base plate, wherein the power box includes at least one power outlet;

a power panel mounted on a fixed structure separate from the base plate;

an electrical connector to connect the power box to the power panel and a power source that supplies power to the power panel such that the accessory is powered via the at least one power outlet; and wherein:

the base plate includes a plurality of power connection interfaces that are separate from the plurality of mounting apertures, wherein each power connection interface includes an inductive charging member configured to interface with an inductive charging member on the accessory;

inductive charging members on the base plate are charged via the power source; and when the one or more protrusions from the accessory are inserted through the plurality of mounting apertures, the inductive charging member on the accessory is aligned with at least one power connection interface of the plurality of power connection interfaces.

* * * * *